US011879366B2

(12) United States Patent
Bayrakdar

(10) Patent No.: US 11,879,366 B2
(45) Date of Patent: Jan. 23, 2024

(54) CONTROL DEVICE

(71) Applicant: Schaeffler Technologies AG & Co. KG, Herzogenaurach (DE)

(72) Inventor: Ali Bayrakdar, Röthenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 561 days.

(21) Appl. No.: 17/259,415

(22) PCT Filed: Jul. 17, 2019

(86) PCT No.: PCT/DE2019/100660
§ 371 (c)(1),
(2) Date: Jan. 11, 2021

(87) PCT Pub. No.: WO2020/015788
PCT Pub. Date: Jan. 23, 2020

(65) Prior Publication Data
US 2021/0254514 A1    Aug. 19, 2021

(30) Foreign Application Priority Data
Jul. 17, 2018   (DE) .................... 10 2018 117 193.5

(51) Int. Cl.
*F01L 1/00*      (2006.01)
*F01L 1/352*    (2006.01)
*H02K 7/00*     (2006.01)
*H02K 7/108*   (2006.01)
*H02K 7/116*   (2006.01)

(52) U.S. Cl.
CPC .............. *F01L 1/352* (2013.01); *H02K 7/003* (2013.01); *H02K 7/108* (2013.01); *H02K 7/116* (2013.01); *F01L 2001/3521* (2013.01)

(58) Field of Classification Search
CPC ................. F01L 1/344; F01L 2820/032; F01L 2001/3521; F16H 49/001
USPC ....................................... 123/90.11
See application file for complete search history.

(56) References Cited

U.S. PATENT DOCUMENTS

| 8,516,982 B2 * | 8/2013 | David ..................... F01L 1/352 |
| | | 29/888.1 |
| 10,711,660 B1 * | 7/2020 | Zehan ................... F01L 1/3442 |
| 2011/0030631 A1 * | 2/2011 | David ..................... F01L 1/344 |
| | | 464/160 |

(Continued)

FOREIGN PATENT DOCUMENTS

| CN | 206205946 U | 5/2017 |
| DE | 2933239 A1 | 2/1981 |
| DE | 102014219364 A1 | 3/2016 |

(Continued)

*Primary Examiner* — Long T Tran
*Assistant Examiner* — James J Kim

(57) ABSTRACT

The disclosure relates to a control device, in particular in an electromechanical camshaft adjuster, comprising an electric motor and a control transmission coupled to the electric motor via a coupling element and designed as a harmonic drive. A two-armed wire coupler is provided as the coupling element, the arms of which engage in openings of an inner ring of a waveform generator of the control transmission, and the wire coupler has a winding which is wound around the motor shaft of the electric motor in a non-rotating manner.

20 Claims, 4 Drawing Sheets

(56) References Cited

U.S. PATENT DOCUMENTS

2016/0298506 A1* 10/2016 Iwasaki .................. F01L 1/022

FOREIGN PATENT DOCUMENTS

| | | |
|---|---|---|
| DE | 102016220631 A1 | 8/2017 |
| DE | 102016210864 A1 | 9/2017 |
| DE | 102016205742 A1 | 10/2017 |
| DE | 102016216594 B3 | 11/2017 |
| DE | 102016222773 B3 | 1/2018 |
| DE | 102016223796 A1 | 3/2018 |
| DE | 102017111035 B3 | 6/2018 |
| GB | 472151 A | 9/1937 |
| JP | H0587155 A | 4/1993 |
| WO | 2004035998 A1 | 4/2004 |
| WO | 2017071698 A1 | 5/2017 |
| WO | 2018091017 A1 | 5/2018 |

* cited by examiner

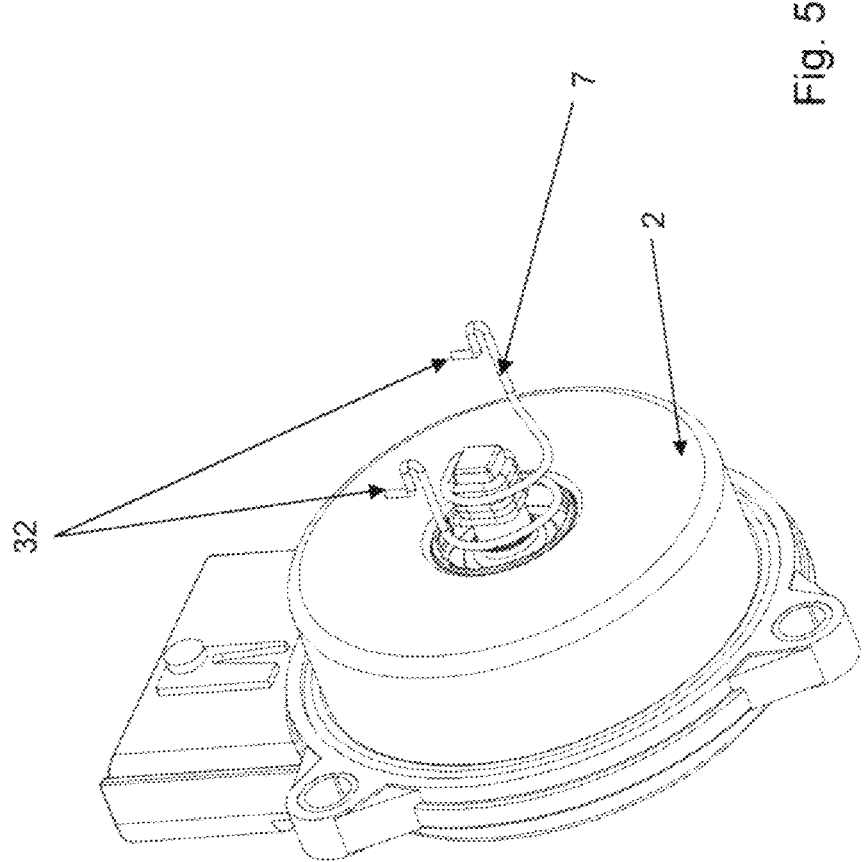

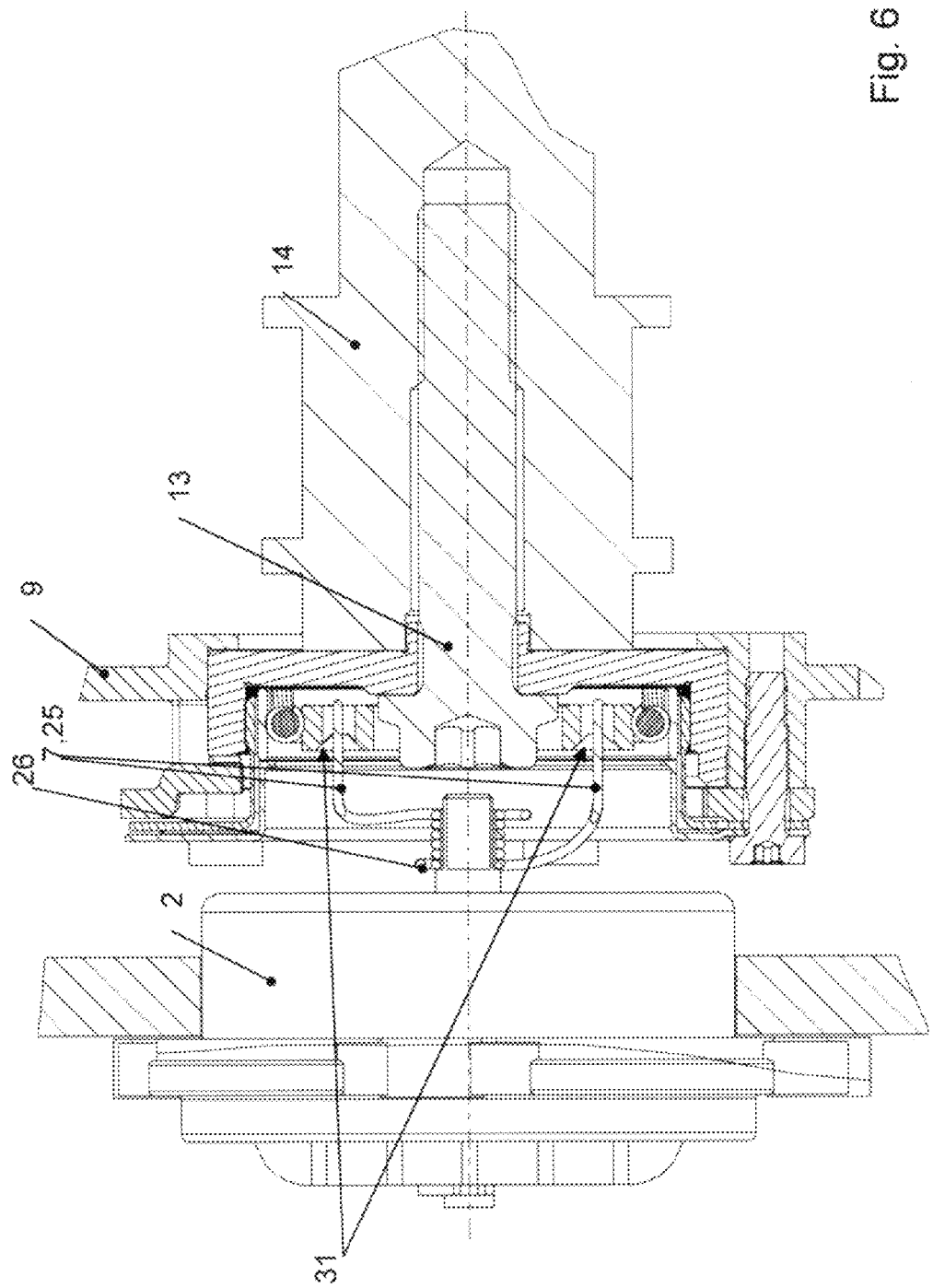

CONTROL DEVICE

CROSS-REFERENCE TO RELATED APPLICATIONS

This application is the U.S. National Phase of PCT Application No. PCT/DE2019/100660 filed on Jul. 17, 2019 which claims priority to DE 20 2018 117 193.5 filed on Jul. 17, 2018, the entire disclosures of which are incorporated by reference herein.

TECHNICAL FIELD

This disclosure relates to a control device which can be used in an electromechanical camshaft adjuster.

BACKGROUND

A generic control device is known, for example, from DE 10 2016 222 773 B3. The known control device comprises a C-shaped compensating element, which enables the compensation of an axial offset between a motor shaft of a servomotor and a component of a harmonic drive. The compensation element can be designed as a one-part or multi-part spring element made of wire.

DE 10 2016 220 631 A1 discloses a control device suitable for an electric camshaft adjuster, in which a spring element is connected between an electric motor and a control transmission. In this case, the spring element is configured as a helical spring.

A control drive is known from DE 10 2016 210 864 A1, which is particularly suitable for a device for adjusting the compression ratio of a reciprocating piston engine. The control drive comprises an electric motor and a control transmission that can be actuated by the latter, wherein a positive coupling in the form of a claw coupling is connected between a flexible gear component and an output element of the control transmission.

SUMMARY

The object of the disclosure is to specify a control device working with a harmonic drive, which is further developed compared to the prior art, is particularly suitable for an electromechanical camshaft adjuster, and which is characterized by a particularly compact, production-friendly structure with high operational reliability at the same time.

According to the disclosure, this object is achieved by a control device with the features described herein. In a known basic structure, the control device comprises an electric motor and a control transmission coupled to same via a coupling element, which is designed as a harmonic drive. A two-armed wire coupler is provided as the coupling element, the arms of which engage in openings of an inner ring of a waveform generator of the control transmission.

According to the disclosure, the wire coupler has a winding which is wound around the motor shaft of the electric motor in a non-rotating manner. No additional parts are required to connect the two-armed wire coupler to the motor shaft of the electric motor, as is the case with the device according to DE 10 2016 222 773 B3 in the form of a central piece. It has been shown that a direct fastening of the two-armed wire coupler on the motor shaft, as described herein, does not result in a loosening of the connection between the motor shaft of the electric motor and the wire coupler, even if the torque transmitted between the electric motor and the control transmission changes frequently in amount and direction.

In an example embodiment, which involves a positive connection in the circumferential direction between the winding of the wire coupler and the motor shaft of the electric motor, the motor shaft has a rectangular, in particular square, cross-section in its area contacting the wire coupler. Other cross-sectional designs that deviate from a circular shape and enable a form fit, for example in the form of a dihedron or a polygon, in particular in the form of a triangle, hexagon or octagon, are also conceivable.

In all cases, the two-armed wire coupler is extremely easy to mount on the motor shaft of the electric motor. The spring and damping properties of the two-armed wire coupler and its low moment of inertia are also advantageous. Furthermore, the elements to be coupled with one another, i.e., on the one hand the motor shaft of the electric motor and on the other hand the inner ring of the waveform generator, do not have to meet extremely high requirements with regard to geometric precession.

Without the use of a separate compensating element, for example in the form of an Oldham disk, the two-armed wire coupler is able to compensate for an axial offset between the servomotor, i.e., the electric motor, and the servomotor, which is designed as a harmonic drive. Here, the wire coupler made of spring wire takes up only a small amount of space in the axial direction compared to the dimensions of the control transmission and the electric motor. The connection established via the two-armed wire coupler can be designed either as a coupling with or without backlash.

According to one possible embodiment, the two-armed wire coupler has end sections of its two arms, which are each designed with two layers. This means that the wire is bent by 180° at the ends of the arms. In this way, enlarged contact areas with the inner ring of the waveform generator to be driven can be produced.

According to a first variant, the ends of the arms formed from wire are bent over in such a way that wire lies on wire. The end of each arm describes the shape of an extremely narrow U, in which the two U-legs touch. An alternative variant provides that a distance is formed between the two U-legs, which are located at the end of each arm. This distance can, for example, correspond to the diameter of the wire or be greater than the wire diameter, for example, double the wire diameter. In this variant, the two U-legs formed from wire of the two-armed coupler, can be moved elastically against one another. This makes it possible to insert each U-shaped bent end of an arm of the wire coupler into an opening in the inner ring of the waveform generator, which is dimensioned such that the ends of the arms can only be inserted into the openings under mechanical pretension. A backlash-free connection between the two-armed wire coupler and the inner ring of the waveform generator can thus be established in the simplest possible manner.

Each arm of the wire coupler has, for example, an inner section which extends essentially in the radial direction of the motor shaft, and an outer section which is oriented parallel to the motor shaft. The two outer sections can have the same length.

According to a further developed design, each of the two arms of the coupler has a winding section which does not rest against any machine elements and which is placed around an imaginary cone. For the sake of simplicity, the winding section is also referred to as a spiral section. In fact, each spiral section only appears as a spiral when viewed along the central axis of the wire coupler. In contrast to a spiral spring, however, the turns of the spiral section do not lie in a single plane. Rather, the so-called spiral section of each arm of the coupler, comparable to a helical spring, also extends in the axial direction, i.e., in the longitudinal direction of the motor shaft of the electric motor. The two spiral sections of the arms of the wire coupler can be arranged one behind the other in the axial direction of the wire coupler. The outer, axially aligned sections of the arms are of different lengths in this embodiment. Overall, this results in an extremely space-saving structure for the wire coupler with pronounced elastic resilience in the circumferential direction at the same time. According to one possible embodiment, the two cones described by the spiral sections emerge from one another by parallel displacement, the tip of each cone within the motor shaft of the electric motor on the central axis of the control device, i.e., the common central axis of the electric motor and the control transmission.

The control device can be used in particular in an electromechanical camshaft adjuster. The control transmission is also suitable for use in a device for varying the compression ratio of a reciprocating piston engine. It is also possible to use the control device in industrial systems, for example in a robot or in a machine tool.

BRIEF DESCRIPTION OF THE DRAWINGS

In the following, several exemplary embodiments of the disclosure are explained in more detail by means of a drawing. In the figures.

DETAILED DESCRIPTION OF THE EMBODIMENTS

Figure 1:
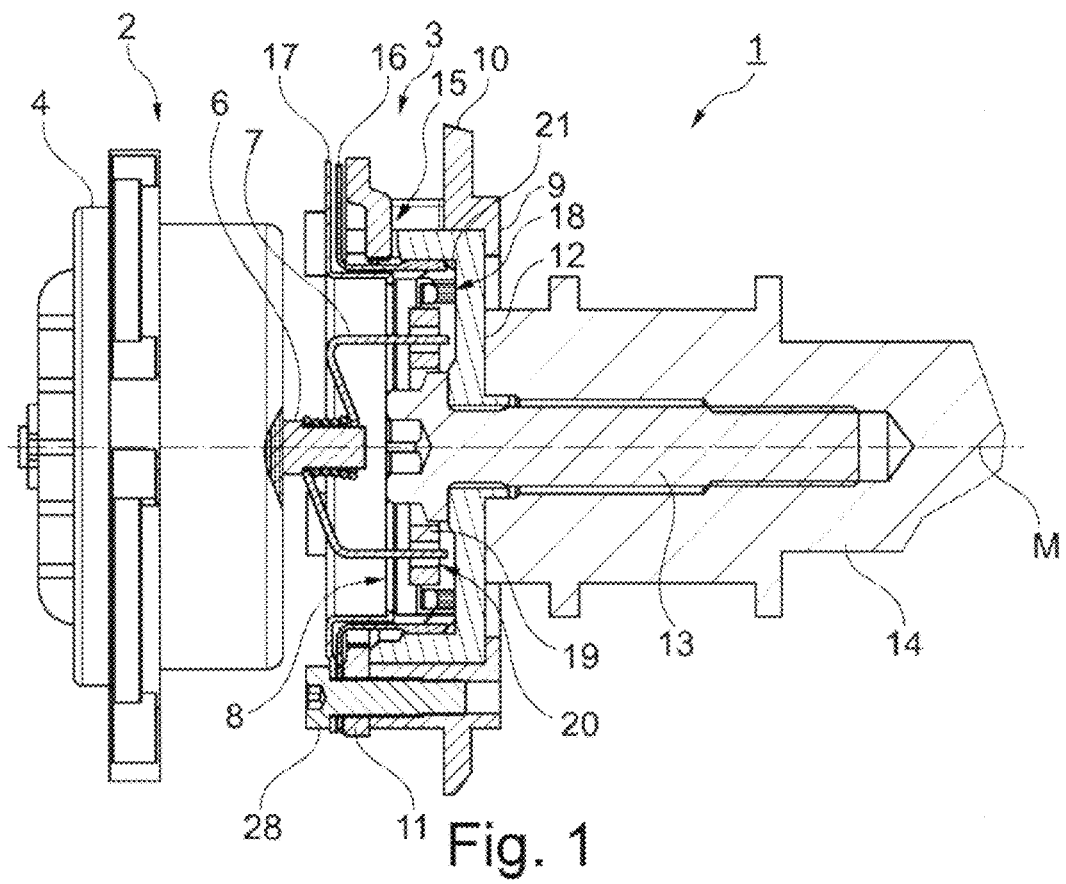
FIG. 1 shows a first exemplary embodiment of a control device in a partially sectioned view.

Unless otherwise stated, the following explanations relate to all exemplary embodiments. Parts that correspond to each other or have basically the same effect are marked with the same reference symbols in all figures A control device marked as a whole with the reference symbol 1 is intended for use as an electromechanical camshaft adjuster in an internal combustion engine. With regard to the basic function of the control device 1, reference is made to the prior art cited at the outset.

The control device 1 comprises an electric motor 2 as a servomotor and a control transmission 3 actuated thereby, which is designed as a harmonic drive. A connection part 5 for the electrical connection of the electric motor 2 including signal transmission is assigned to the motor housing of the electric motor 2, which is designated by 4. The electric motor 2 is designed as an internal rotor and has a motor shaft 6 which interacts with the control transmission 3 via a coupling element 7 in the form of a two-armed wire coupler, also referred to as a coupler for short.

The control transmission 3 comprises a waveform generator 8, which, together with further components, is arranged in the non-closed transmission housing of the harmonic drive 3 designated by 9. In the exemplary embodiments, the transmission housing 9 is connected in one piece to a chain wheel 10. The chain wheel 10 is driven by a chain (not shown) and rotates in a manner known per se at half the crankshaft speed of the internal combustion engine.

The control transmission 3 is a three-shaft gear, wherein the transmission housing 9 includes the chain wheel 10 representing one of the three shafts. Another shaft is in the form of an output element 12 designed as a ring gear, which is rotatably mounted in the transmission housing 9. Here, a slide bearing in the radial direction is provided directly through the transmission housing 9. An axial slide bearing of the output element 12 in a first direction is also provided directly through the transmission housing 9. In the opposite axial direction, the output element 12 is supported by a stop washer 11, which is firmly connected to the transmission housing 9. In addition, the stop washer 11 and the output element 12 form stop contours 15 which limit the angle of rotation between the output element 12 and the transmission housing 9.

The output element 12 is connected to the camshaft designated by 14 by means of a central screw 13. The common central axis of the camshaft 14 and of the control device 1 is denoted by M. The camshaft 14 can be an intake or an exhaust camshaft of the internal combustion engine.

An elastic, externally toothed transmission element in the form of a collar sleeve 16 is fastened to the transmission housing 9. A front cover 17 is placed in front of the collar sleeve 16. The front cover 17, together with the collar sleeve 16, is fixed to the transmission housing 9 with screws 28, which also penetrate the stop washer 11. The front cover 17, like the collar sleeve 16, has a hat shape, i.e., a collar shape with a sleeve-shaped, cylindrical section and an adjoining, radially outwardly directed flange.

The waveform generator 8 is assigned a roller bearing 18, which is designed as a ball bearing in the exemplary embodiments. An inner ring 19 of the roller bearing 18 has openings 20 into which arms 22, 23 of the coupling element 7 engage. The engagement of the two arms 22, 23 in the openings 20 is designed in such a way that both an offset in the axial direction and an offset in the radial direction between the control transmission 3 and the electric motor 2 can be compensated.

In contrast to the inner ring 19, the outer ring of the roller bearing 18, denoted by 21, is designed to be flexible and is arranged directly within the externally toothed section of the collar sleeve 16. The external toothing of the collar sleeve 16 partially engages an internal toothing of the output element 12 in a manner known per se, wherein the number of teeth of the above-mentioned toothing differ slightly from the new number of teeth of the external toothing of the elastic transmission element 16. The harmonic drive 3 thus functions as a highly reduced control transmission, wherein the inner ring 19 represents its third shaft.

Figure 2:
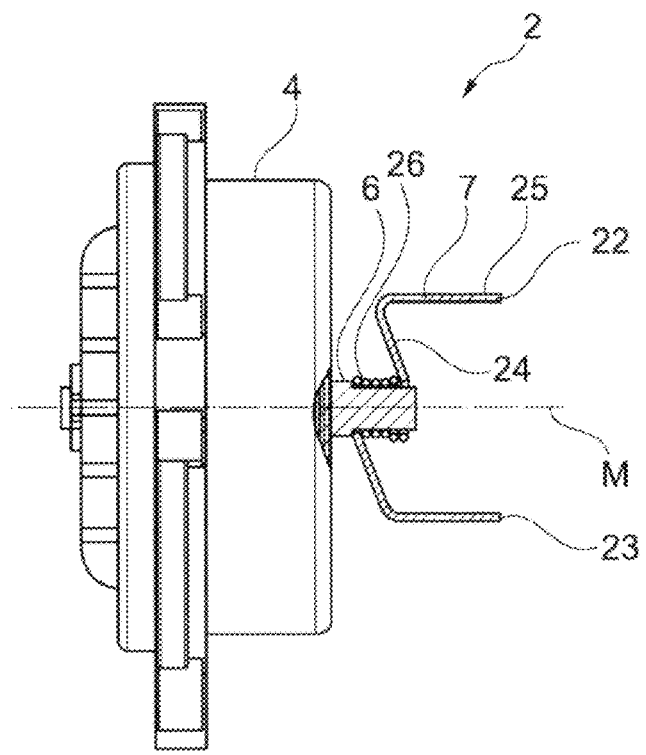
FIG. 2 shows components of the arrangement according to FIG. 1, namely an electric motor with a coupling element connected thereto.

In the embodiment according to FIGS. 1 and 2, each arm 22, 23 of the coupling element 7 has an inner arm section 24 and an adjoining outer arm section 25 which runs in the axial direction, i.e., parallel to the central axis M. The two outer arm sections 25 are of equal length in this case. The inner arm sections 24 are connected to one another via a winding 26 which is wound directly around the motor shaft 6. The motor shaft 6 is designed as a rectangular profile RP in this area, so that there is a form fit between the coupling element 7 and the motor shaft 6 in the circumferential direction.

Figure 3:
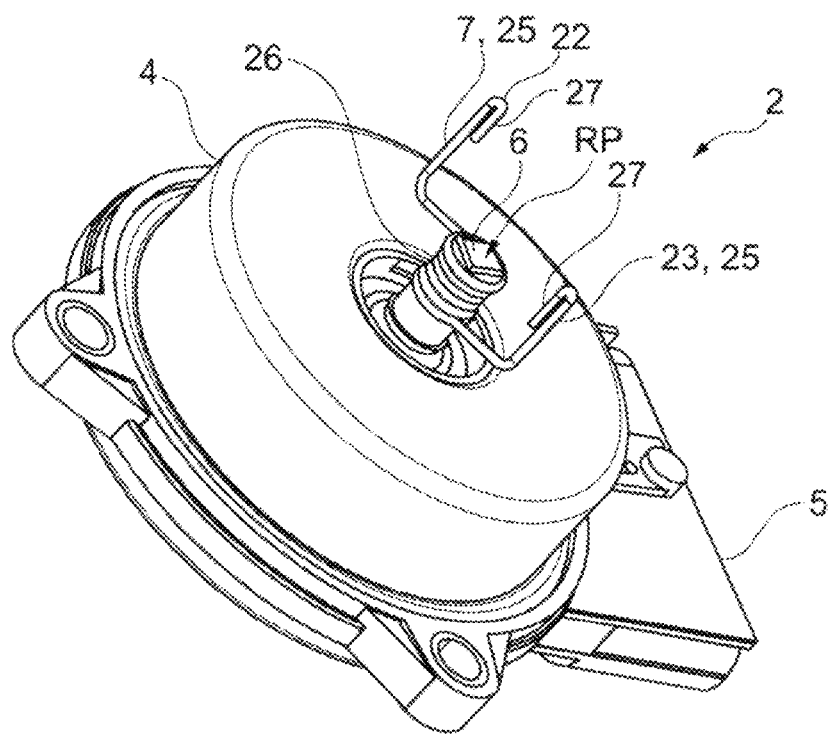
FIG. 3 shows an electric motor with a modified coupling element connected thereto in a perspective view.

The coupling element 7 of the exemplary embodiment according to FIG. 3 corresponds to the design according to FIGS. 1 and 2 with regard to the design of the winding 26, the geometry of the inner arm sections 24, and the length and alignment of the outer arm sections 25. The same applies to the square shape of the rectangular profile RP of the motor shaft 6. The coupling element 7 according to FIG. 3 can be used in the control device 1 according to FIG. 1 without exchanging or modifying further parts. As can be seen from FIG. 3, each outer arm section 25 has a bent section 27 at its end. By means of these bent sections 27, the contact areas between the arms 22, 23 and the inner ring 19 are enlarged. At the same time, the free radial mobility between the coupling element 7 and the waveform generator 8 is restricted in comparison to the design according to FIG. 1.

Figure 4:
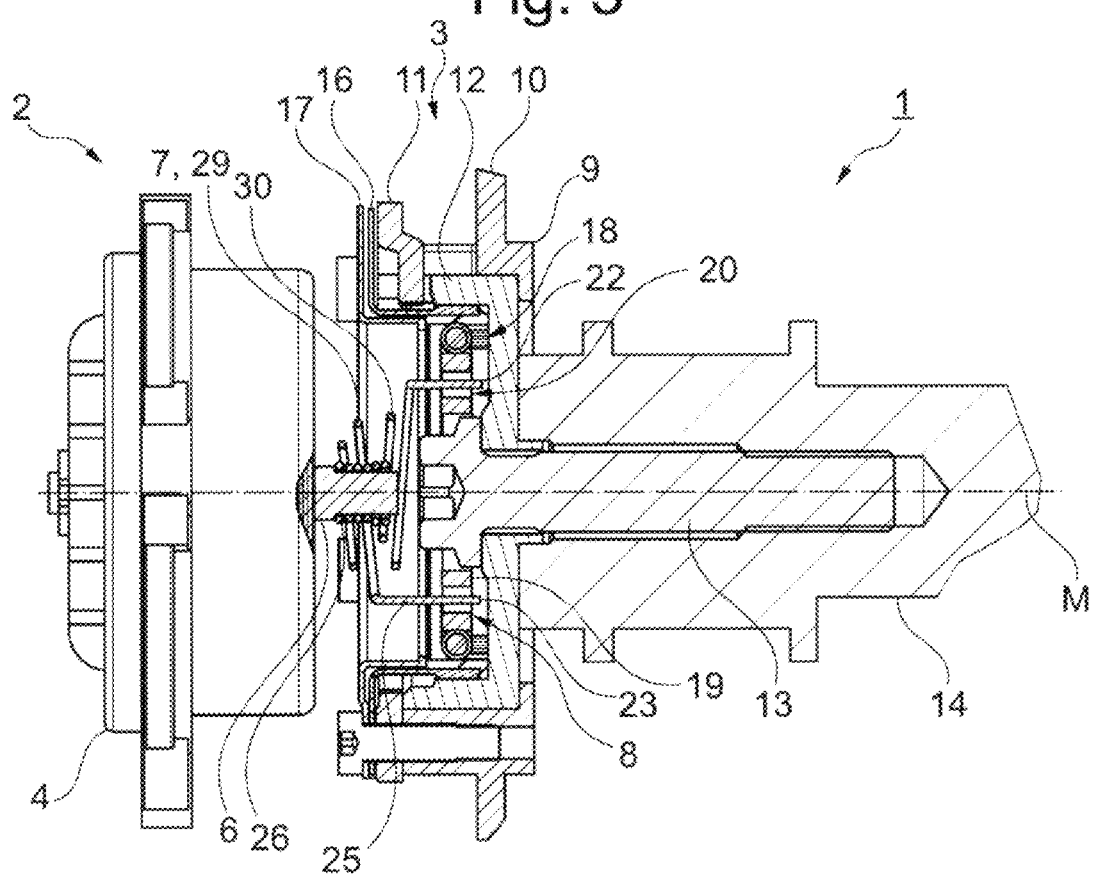
FIG. 4 shows a further embodiment of a control device in a view analogous to FIG. 1, and FIGS. 5 and 6 show a further embodiment of a control device.

The embodiment according to FIG. 4 differs from the designs according to FIGS. 1 to 3 in that the outer arm sections 25 are not connected to the winding 26 via straight sections, but rather via so-called spiral sections 29, 30. In this case too, the entire coupling element 7 is produced as a one-piece part from spring wire. Each spiral section 29, 30 describes the shape of a spatially bent curve which is placed around an imaginary cone, the tip of which lies within the motor shaft 6 on the central axis M. Each spiral section 29, 30 thus represents an intermediate part between a spiral spring and a helical spring. Due to the spiral sections 29, 30, the coupling element 7 of the exemplary embodiment according to FIG. 4 is designed to be softer in the circumferential direction compared to the designs according to FIGS. 1 to 3. This means that a certain torque acting between the inner ring 19 and the motor shaft 6 leads to a stronger rotation between the motor shaft 6 and the inner ring 19. This rotation must be taken into account when activating the electric motor 2 and has a damping effect on forces and torques acting within the control device 1.

When installing the electric motor 2, it must be sealed to prevent the oil from leaking out. This requires a seal that is threaded and pressed into the seal space, and thus an increased assembly force. At the same time, the wire coupler 7 should be threaded. When threading it is difficult to see, both optically and because of the increased assembly force, whether the wire coupler 7 was actually threaded or not. This is not only disadvantageous for the cycle time, but the wire coupler 7 can also be damaged during assembly. FIGS. 5 and 6 show a variant of the wire coupler 7 from FIG. 3, which avoids this problem. For this purpose, the arm sections 25, 26 are guided in a guide channel 31. The arms 22, 23 only thread into the openings 20 provided for them during the initial start-up. The openings 20 can form partial sections of the guide channel 31. The disclosure therefore also comprises an assembly method in which the arms 22, 23 initially only engage in the, for example, annular or partially annular guide channel 31 and not yet or only incidentally finally engage in the openings 20. Only in a subsequent step, for example when the electric motor 2 is started up, do the arms 22, 23 thread into the openings 20.

In one embodiment, the control device can have more openings 20 than arms 22, 23 on the circumference of the inner ring in order to enable locking not only in exactly one position, but also with less rotation.

As is clear from FIG. 5, the wire coupler 7 can have end-side, in the present case radially directed bends 32 which provide an axial stop on the inner ring 19 during assembly. The wire coupler 7 is protected from overload, and haptic feedback is conveyed.

LIST OF REFERENCE SYMBOLS

1 Control device
2 Electric motor, servomotor
3 Control transmission
4 Motor housing
5 Connection part
6 Motor shaft
7 Coupling element, wire coupler
8 Waveform generator
9 Transmission housing
10 Chain wheel
11 Stop washer
12 Output element
13 Central screw
14 Camshaft
15 Stop contours
16 Collar sleeve
17 Front cover
18 Rolling bearing
19 Inner ring
20 Opening
21 Outer ring
22 Arm
23 Arm
24 Inner arm section
25 Outer arm section
26 Winding
27 Bent section
28 Screw
29 Spiral section
30 Spiral section
31 Guide ramps
32 Bend
M Central axis
RP Rectangular profile

The invention claimed is:

1. A control device, comprising:
an electric motor;
a harmonic drive;
a wire coupler configured to couple the electric motor to the harmonic drive, the wire coupler having:
two arms configured to engage openings of an inner ring of a waveform generator of the harmonic drive; and
a winding wound around a motor shaft of the electric motor in a non-rotating manner.

2. The control device of claim 1, wherein the motor shaft has a non-circular cross-section in an area around which the wire coupler is wound.

3. The control device claim 2, wherein the motor shaft has a rectangular cross-section.

4. The control device of claim 1, wherein an end of each of the two arms is bent to form two layers.

5. The control device of claim 1, wherein the two arms have outer sections of equal length extending in an axial direction of the electric motor.

6. The control device of claim 1, wherein the two arms each have a spiral section extending from the winding, the spiral sections defining a surface of a cone.

7. The control device of claim 6, wherein a first of the two arms has a first outer section with a first length, and a second of the two arms has a second outer section with a second length, the first and second outer sections extending in an axial direction of the electric motor, and the first length different than the second length.

8. The control device of claim 1, wherein at least one of the two arms has a bend at an end, the bend forming an axial stop.

9. The control device of claim 1, wherein the inner ring has guide channels configured to guide the two arms during assembly.

10. The control device of claim 1 arranged within an electromechanical camshaft adjuster.

11. The control device of claim 1, wherein a first of the two arms has a first outer section with a first length, and a second of the two arms has a second outer section with a second length, the first and second outer sections extending in an axial direction of the electric motor, and the first length different than the second length.

12. A control device, comprising:
an electric motor;
a harmonic drive;
a wire coupler configured to couple the electric motor to the harmonic drive, the wire coupler configured as a single continuous wire having:
 a first end configured to engage a first opening of an inner ring of a waveform generator of the harmonic drive; and,
 a second end configured to engage a second opening of the inner ring; and,
a winding wound around a motor shaft of the electric motor in a non-rotating manner, the winding formed between the first and second ends.

13. The control device of claim 12, wherein the first end of the wire coupler extends from a first end of the winding, and the second end of the wire coupler extends from a second end of the winding.

14. The control device of claim 12, wherein the motor shaft has a non-circular cross-section in an area around which the wire coupler is wound.

15. The control device of claim 12, wherein at least one of the first or second ends of the wire coupler is bent to form two layers.

16. The control device of claim 12, wherein the first end of the wire coupler forms a first arm having a first outer section extending in an axial direction of the electric motor, and the second end of the wire coupler forms a second arm having a second outer section extending in the axial direction of the electric motor, and a length of the first outer section is equal to a length of the second outer section.

17. The control device of claim 12, wherein the first end of the wire coupler forms a first arm having a first outer section extending in an axial direction of the electric motor, and the second end of the wire coupler forms a second arm having a second outer section extending in the axial direction of the electric motor, and a length of the first outer section is different than a length of the second outer section.

18. The control device of claim 12, wherein the first and second ends of the wire coupler define a surface of a cone.

19. The control device of claim 12, wherein at least one of the first or second ends has a bend which forms an axial stop.

20. The control device of claim 12, wherein the inner ring has guide channels configured to guide the first and second ends during assembly.

* * * * *